US012792662B2

(12) United States Patent
Amick et al.

(10) Patent No.: US 12,792,662 B2
(45) Date of Patent: Nov. 10, 2026

(54) COMPUTER SYSTEM AND METHOD FOR SURFACING RELEVANT FORENSIC DATA IN A DIGITAL FORENSIC INVESTIGATION OF ONE OR MORE DATA STORAGE DEVICES

(71) Applicant: Magnet Forensics Inc., Waterloo (CA)

(72) Inventors: Harold C. Amick, Winchester, VA (US); Chad Eric Gish, Antioch, TN (US)

( * ) Notice: Subject to any disclaimer, the term of this patent is extended or adjusted under 35 U.S.C. 154(b) by 224 days.

(21) Appl. No.: 18/889,984

(22) Filed: Sep. 19, 2024

(65) Prior Publication Data

US 2025/0094483 A1 Mar. 20, 2025

Related U.S. Application Data

(60) Provisional application No. 63/583,750, filed on Sep. 19, 2023.

(51) Int. Cl.
*G06F 16/55* (2019.01)
*G06F 16/353* (2025.01)

(52) U.S. Cl.
CPC ............ *G06F 16/55* (2019.01); *G06F 16/353* (2019.01)

(58) Field of Classification Search
None
See application file for complete search history.

(56) References Cited

U.S. PATENT DOCUMENTS

| | | | | |
|---|---|---|---|---|
| 8,219,588 | B2 * | 7/2012 | Bousquet | G06F 16/2465 707/791 |
| 9,680,844 | B2 * | 6/2017 | Thornbury | H04L 63/1408 |
| 11,625,526 | B2 * | 4/2023 | Saliba | G06F 16/168 715/739 |
| 12,141,272 | B2 * | 11/2024 | Saliba | H04L 63/302 |
| 12,229,211 | B2 * | 2/2025 | Casadio | G06F 16/906 |
| 12,518,046 | B2 * | 1/2026 | Silva | G06F 16/2445 |
| 2017/0012998 | A1 * | 1/2017 | Thornbury | G06Q 50/18 |
| 2017/0300594 | A1 * | 10/2017 | Cosentino | G06Q 10/00 |
| 2022/0043907 | A1 * | 2/2022 | Saliba | G06F 21/552 |
| 2023/0395439 | A1 * | 12/2023 | Wable | H04N 23/57 |
| 2023/0409658 | A1 * | 12/2023 | Casadio | G06F 16/906 |
| 2025/0068723 | A1 * | 2/2025 | Saliba | H04L 63/302 |
| 2025/0094483 | A1 * | 3/2025 | Amick | G06F 16/353 |

* cited by examiner

*Primary Examiner* — Anand P Bhatnagar
(74) *Attorney, Agent, or Firm* — Own Innovation Inc.; James W. Hinton; Caitlin O'Flynn

(57) ABSTRACT

Provided are systems and methods for surfacing relevant forensic data in a digital forensic investigation. A system comprises an investigation module configured to generate an investigation interface, wherein the investigation interface includes a field for selecting a case type from a plurality of case types and wherein upon selection of the case type the investigation interface displays a plurality of case type dependent data input fields for inputting case-relevant information, at least one artificial intelligence (AI) model configured to create at least one algorithm for surfacing and evaluating forensic data based on the case-relevant information, and an evidence module configured to scan at least one target device using the at least one algorithm and acquire relevant forensic data, and generate at least one visualization of the acquired relevant forensic data and at least one visualization of at least one evidence value score for each of the acquired relevant forensic data.

20 Claims, 6 Drawing Sheets

600

COMPUTER SYSTEM AND METHOD FOR SURFACING RELEVANT FORENSIC DATA IN A DIGITAL FORENSIC INVESTIGATION OF ONE OR MORE DATA STORAGE DEVICES

TECHNICAL FIELD

The embodiments disclosed herein relate generally to digital forensics, and, in particular to systems and methods for creating and employing algorithms to automatically surface and display relevant material in a digital forensic investigation.

INTRODUCTION

In a digital forensic investigation, an investigator must identify files and/or data from electronic storage media of a device of interest ("target device") which are relevant to an investigation. Currently, searching methods include acquiring a digital forensic image of the target device and then searching or processing the acquired forensic image for forensically relevant data manually by an investigator inputting what they consider to be important search parameters. Case backlogs are high and the amount of data which must be searched for a single investigation can be immense. In some circumstances, minimizing the amount of time it takes to acquire relevant evidence is imperative. However, the current approach to digital forensic investigation can lead to long search times and the potential to miss important pieces of evidence when the timeframe of the investigation is limited. Even when potential evidence is found, determining the value of the data can be difficult and relies on the judgement of the investigator user.

Accordingly, there is a need for systems and methods which allow for streamlined investigations which ranking filtered data to surface relevant digital forensic evidence.

SUMMARY

Provided herein may be a system for surfacing relevant forensic data in a digital forensic investigation, the system comprising a user interface module configured to generate a user interface for interaction with a user an investigation module configured to generate an investigation interface, wherein the investigation interface may include a field for selecting a case type from a plurality of case types and wherein upon selection of the case type the investigation interface displays a plurality of case type dependent data input fields for inputting case-relevant information, at least one artificial intelligence (AI) model selected from a plurality of AI models based on the case-relevant information, the at least one AI model configured to create at least one algorithm for surfacing forensic data based on the case-relevant information and generating at least one evidence score for each of the surfaced forensic data, and an evidence module configured to: scan at least one target device using the at least one algorithm and acquire relevant forensic data, and generate an evidence interface, wherein the evidence interface may include at least one visualization of the acquired relevant forensic data and at least one visualization of at least one evidence value score for each of the acquired relevant forensic data.

The system may further comprise a refining module configured for the user to refine the data input fields.

The at least one AI model may include a chat classification model.

The chat classification model may include pre-processing wherein an input chat thread is divided into chunks using a sliding window algorithm, and wherein each chunk is used as an input and the chat classification model outputs an evidence value score for each chunk.

The at least one AI model may include an image classifier model.

The image classifier model may be a picture classifier wherein a plurality of images are input into the picture classifier and the picture classifier outputs an evidence value score for each image.

The image classifier model may be an object classifier wherein a plurality of images are input into the object classifier and the object classifier outputs an evidence value score for each object in each image.

The at least one evidence value score of each of the acquired relevant forensic data may be calculated by comparison to past cases.

The at least one evidence value score of each of the acquired relevant forensic data may be calculated as a ranking within the acquired relevant forensic data.

The system may further comprise an output module configured to generate a report.

The data input fields may be generated from previous case data.

Also provided herein is a method of surfacing relevant forensic data in a digital forensic investigation, the method comprising generating, by an investigation module, an investigation interface including a field for selecting a case type, displaying on the investigation interface, upon selection of a case type, a plurality of case type dependent data input fields for receiving case-relevant information, selecting at least one AI model from a plurality of AI models based on the case-relevant information, generating, by the at least one AI model, at least one algorithm for surfacing and evaluating forensic data, scanning at least one target device for relevant forensic data using the at least one algorithm, acquiring the relevant forensic data, assigning at least one evidence score for each of the acquired relevant forensic data using the at least one algorithm, and generating an evidence interface, by an evidence module, wherein the evidence interface may include at least one visualization of the acquired relevant forensic data and at least one visualization of the at least one evidence value score of each of the acquired relevant forensic data.

The method may further comprise refining the data input fields by a refining module.

The at least one AI model may include a chat classification model.

The method may further comprise pre-processing an input chat thread by the chat classification model, wherein the input chat thread is divided into chunks using a sliding window algorithm, and wherein each chunk is used as an input and the chat classification model outputs an evidence value score for each chunk.

The at least one AI model may include an image classifier model.

The image classifier model may be a picture classifier wherein a plurality of images are input into the picture classifier and the picture classifier outputs an evidence value score for each image.

The image classifier model may be an object classifier wherein a plurality of images are input into the object classifier and the object classifier outputs an evidence value score for each object in each image.

The at least one evidence value score of each of the acquired relevant forensic data may be calculated by comparison to past cases.

The at least one evidence value score of each of the acquired relevant forensic data may be calculated as a ranking within the acquired relevant forensic data.

The method may further comprise generating a report by an output module.

The data input fields may be generated from previous case data.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
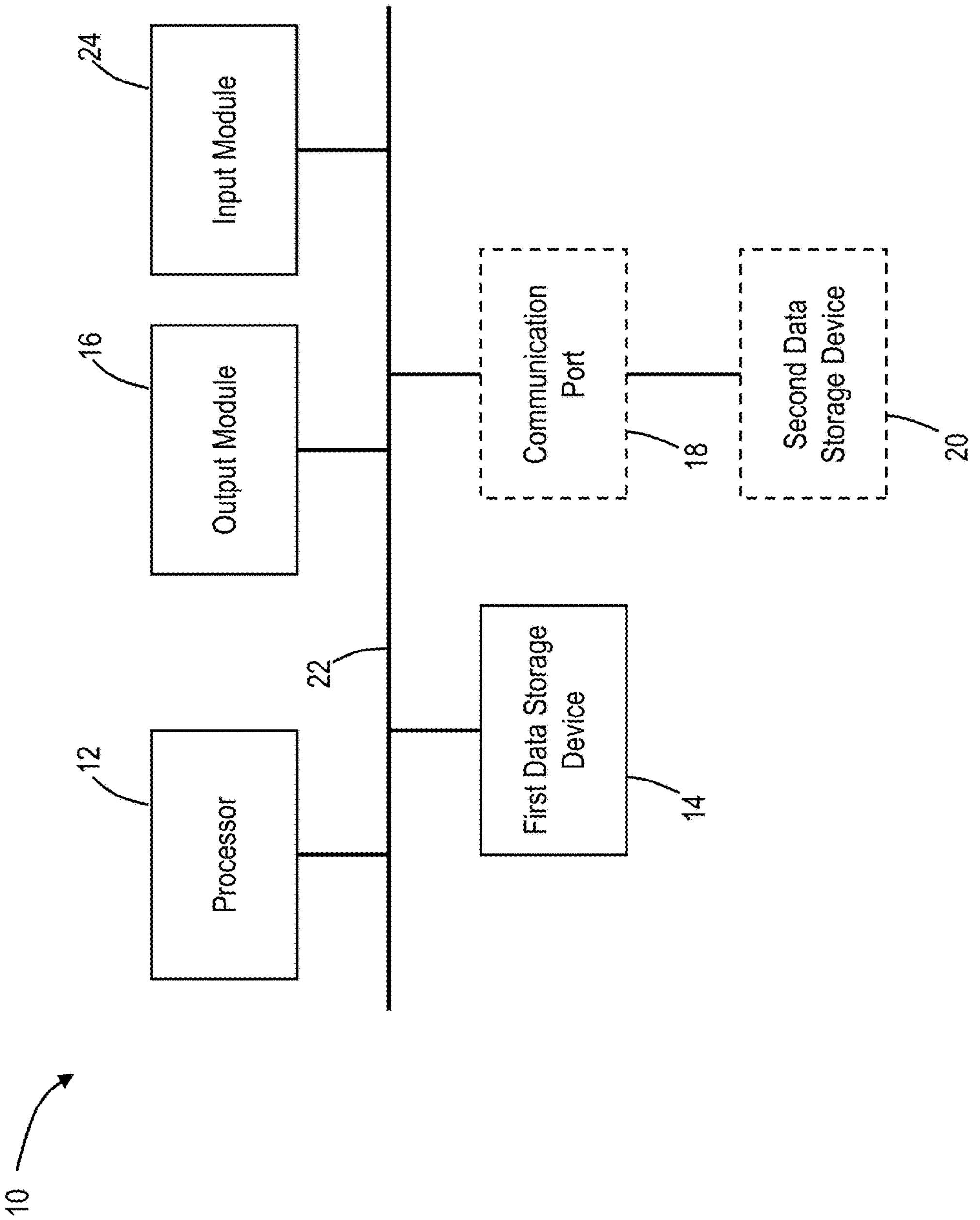
FIG. 1 is a block diagram of a computing device for surfacing and displaying relevant forensic data, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods, and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of more than one device or article.

Generally, as used herein, the term "target device" refers to any device capable of storing data in electronic storage media (or data storage device) and which is subject to a digital forensic investigation. Generally, a digital forensic investigation refers to the processing of one or more target devices to acquire, collect, refine, or extract data that is relevant or potentially relevant to an investigation. The term "target dataset" refers to a collection of electronically stored information or data stored on the electronic storage media of the target device, of which a subset may be acquired from the target device and subsequently processed and analyzed for digital forensic investigation. Generally, a target dataset may be acquired from a target device and a forensic data collection generated therefrom, which may include the target dataset in its acquired form along with forensic data artifacts extracted therefrom and analysis outputs generated from the extracted forensic data artifacts. Forensic data artifacts may be categorized by artifact type. For example, artifact types may include image type artifacts, chat type artifacts, document type artifacts, etc. Refining modules may be used and specifically configured to extract data from the target dataset and generate an artifact of a particular type.

Herein, "data item", "data items", or similar are discussed. It is to be understood that these terms may include complete files but also encompasses data, metadata, partial files, hashes of files, reduced size files, or any other such information that can be scanned within the target dataset and may be useful to a digital forensic investigation.

Current methods of digital forensic investigation include creating single-use filters based on single to a few parameters which are considered of interest or important to an investigation and likely to result in surfacing of relevant evidence. An investigator decides which elements of the case are likely to be important and searches through data from a target device based on those elements. For example, the investigator may know that there is a specific person of interest who has a nickname and may create a filter to search through the target device data for that nickname. Any data item or data artifacts which include that nickname would then be surfaced for the investigator to review, but there may be multiple instances of data items or artifacts which include the nickname but provide no value to an investigation. This can waste valuable time. The present disclosure provides computer systems and methods for creating and employing algorithms to automatically surface and display relevant forensic data in an investigation of one or more target devices.

The present disclosure enables an investigator to, at the outset of an investigation, create an algorithm specific to the case. The computer system can execute the algorithm to quickly scan a target dataset for relevant evidence in the form of data or files and score the evidence based on a predicted evidence value to the investigation. In current methods of digital forensic investigation, the software tools and filters used to find evidence are discrete components which do not work together. In the systems and methods of the present disclosure, the algorithm allows for contextual searching wherein relevant evidence is searched for, surfaced, and displayed by the computer system relative to other evidence. The computer system thus executes the processing and investigation of one or more target datasets holistically instead of in a piecemeal manner.

In an embodiment, the computer system of the present disclosure generates an algorithm from at least one artificial intelligence (AI) model which has been trained on evidence (digital forensic data) from past cases of a specific case type. The system provides one or more selectable case types in a user interface. The computer system prompts, via the user interface, entry of specific details of interest (e.g., a timeline of events, names of persons of interest, locations, keywords, etc.) known to be relevant to the case type into data entry fields. The data entry fields are determined and displayed based on the case type. For example, a first case type may have a first set of data entry fields for entering details of interest and a second case type may have a second set of data entry fields for entering details of interest, where the respective data entry fields are specific to the case type and displayed in response to receiving a selection of the corresponding case type in the user interface. The system may then either automatically select one or more AI models or suggest one or more AI models for the user to select from (e.g., by displaying the one or more AI models as selectable UI elements in the user interface). AI models for the same case type may vary depending on the known facts of the case and the similarity of the known facts to the data upon which the models were trained.

Each AI model may encode a set of rules for determining and outputting an evidence value score for any evidence which is identified by the algorithm. An evidence value score may be measured against a standard system of scoring stored by the system and against the other found evidence within the case. A piece of potential evidence (e.g., a forensic data item or forensic data artifact) may have more than one evidence value score. That is, a piece of evidence may be given a high or low score when compared to past case data regarding the value of a specific type of evidence to an investigation/prosecution and may also be given a rank when compared to the other pieces of evidence surfaced by operation of the model (e.g., the most relevant piece of evidence may be ranked first even if the likelihood of the evidence being useful is low).

The selected AI model is then used to create an algorithm which can search through and filter target device data for relevant data based on information input into the case type and then score and/or rank the surfaced evidence. The algorithm may be refined during the search based on relevant evidence that is surfaced and which changes the context or relationships between pieces of evidence. For example, it is possible that a first piece of forensic data may have a first determined relevance when originally identified. Upon identifying a second piece of forensic data that is related to the first piece of forensic data, the determined relevance of the first piece of forensic data may increase. Likewise, the relevance of the second piece of forensic data may increase through identification of the relationship with the first piece of forensic data or other forensic data identified by the system.

The output of the algorithm includes relevant data items or artifacts (i.e., evidence). The computer system generates a user interface and displays the relevant data items in the user interface. The interface visualizes the entire context of the relevant evidence within the case. For example, the evidence may be displayed on a timeline and/or a map, where multiple surfaced data artifacts are plotted on the timeline or map, for example using metadata (e.g., timestamps or geographical location data). The interface also displays the rank or score of each piece of evidence in the visualization. The system may generate a report reflecting the forensic evidence visualized in the user interface, or some portion thereof.

Essentially, an entire investigation can be completed or "solved" for an investigator where the only input from the investigator is a case type and case-relevant information which the investigator inputs into fields which are specific for the case type. The AI model generates an algorithm and the investigator device executes the algorithm to complete the investigation and generates and displays a user interface of scored relevant evidence, which may be shown on a timeline and/or map visualization, without any further input from the investigator user. The computer system of the present disclosure may thus enable the execution and completion of more efficient automated investigation of forensic datasets.

Referring now to FIG. 1, shown therein is a system 10 for surfacing and displaying relevant digital forensic data, according to an embodiment.

The system 10 includes a processor 12, a first data storage device 14, an output module 16, a communication port 18, a second data storage device 20 coupled to the communication port 20 and an input module 24. In this embodiment, the various components 12, 14, 16, 18, and 24 of the system 10 are operatively coupled using a system bus 22.

The system 10 may be various electronic devices such as personal computers, networked computers, portable computers, portable electronic devices, personal digital assistants, laptops, desktops, mobile phones, smart phones, tablets, and so on.

In some examples, the first data storage device 14 may be a hard disk drive, a solid-state drive, or any other form of suitable data storage device and/or memory that may be used in various electronic devices. The data storage device 14 may have various data stored thereon. Generally, the data stored on the data storage device 14 includes data that may be of forensic value to a digital forensic investigation and from which forensic artifacts can be recovered or extracted and then processed or analyzed (e.g., ranked or scored according to relevance) and displayed in a graphical user interface.

In the embodiment as shown, another data storage device in addition to the first data storage device 14, namely the second data storage device 20, is provided. The second data storage device 20 may be used to store computer-executable instructions that can be executed by the processor 12 to configure the processor 12 to generate and use a model to surface and rank/score forensic data artifacts and display surface data in a user interface based on data stored in the data storage device 14 or of data acquired from the first data storage device 14 and stored in the second data storage device 20.

It should be noted that it is not necessary to provide a second data storage device, and in other embodiments, the instructions may be stored in the first data storage device 14 or any other data storage device.

In some cases, the first data storage device 14 may be a data storage device external to the system 10 or processor 12. For example, the first data storage device 14 may be a data storage component of an external computing device (e.g., a data server) that stores forensic evidence for subsequent processing and display. In such cases, the processor 12 may be configured to execute computer-executable instructions (stored in second data storage device 20) to acquire digital forensic evidence of the first data storage device 14 and store the digital forensic evidence in the second data storage device 20.

The processor 12 may be configured to provide a user interface to the output module 16. The output module 16, for example, may be a suitable display device, and/or output device coupled to the processor 12. The display device may include any type of device for presenting visual information. For example, a display device may be a computer monitor, a flat-screen display, a projector, or a display panel. The output device may include any type of device for presenting a hard copy of information, such as a printer for example. The output device may also include other types of output devices such as speakers, for example. The user interface allows the processor 12 to solicit input from a user regarding various types of operations to be performed by the processor 12. The user interface also allows for the display of various output data and selections, such as case type selections and other data inputs and timeline or map visualizations of surfaced data artifacts, generated by the processor 12.

The input module 24 may include any device for entering information into system 10. For example, input module 24 may be a keyboard, keypad, cursor-control device, touchscreen, camera, or microphone. It will be appreciated that in certain embodiments the input module 24 and the output module 16 are the same device. As an example, the input module 24 and the output module 16 may be a single touchscreen, or a smart speaker.

The system 10 may be a purpose-built machine designed specifically for surfacing and displaying relevant forensic data artifacts extracted from a target device. In some cases, system 10 may include multiple of any one or more of processors, applications, software modules, second storage devices, network connections, input devices, output devices, and display devices.

The system 10 may be a server computer, desktop computer, notebook computer, tablet, PDA, smartphone, or another computing device. The system 10 may include a connection with a network such as a wired or wireless connection to the Internet. In some cases, the network may include other types of computer or telecommunication networks. The system 10 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage. Processor 12 may execute applications, computer readable instructions or programs. The applications, computer readable instructions or programs may be stored in memory or in secondary storage or may be received from the Internet or other network.

Although system 10 is described with various components, one skilled in the art will appreciate that the system 10 may in some cases contain fewer, additional, or different components. In addition, although aspects of an implementation of the system 10 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the system 10 and/or processor 12 to perform a particular method.

In the description that follows, devices such as system 10 are described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, a user using the system 10 may manipulate one or more input devices (not shown; e.g., a mouse and a keyboard) to interact with a user interface displayed on a display of the system 10. In some cases, the system 10 may generate and/or receive a user interface from the network (e.g., in the form of a webpage). Alternatively, or in addition, a user interface may be stored locally at a device (e.g., a cache of a webpage or a mobile application).

In response to receiving information, the system 10 may store the information in storage database. The storage may correspond with secondary storage of the system 10. Generally, the storage database may be any suitable storage device such as a hard disk drive, a solid state drive, a memory card, or a disk (e.g., CD, DVD, or Blu-ray etc.). Also, the storage database may be locally connected with the system 10. In some cases, the storage database may be located remotely from system 10 and accessible to system 10 across a network for example. In some cases, the storage database may comprise one or more storage devices located at a networked cloud storage provider.

Figure 2:
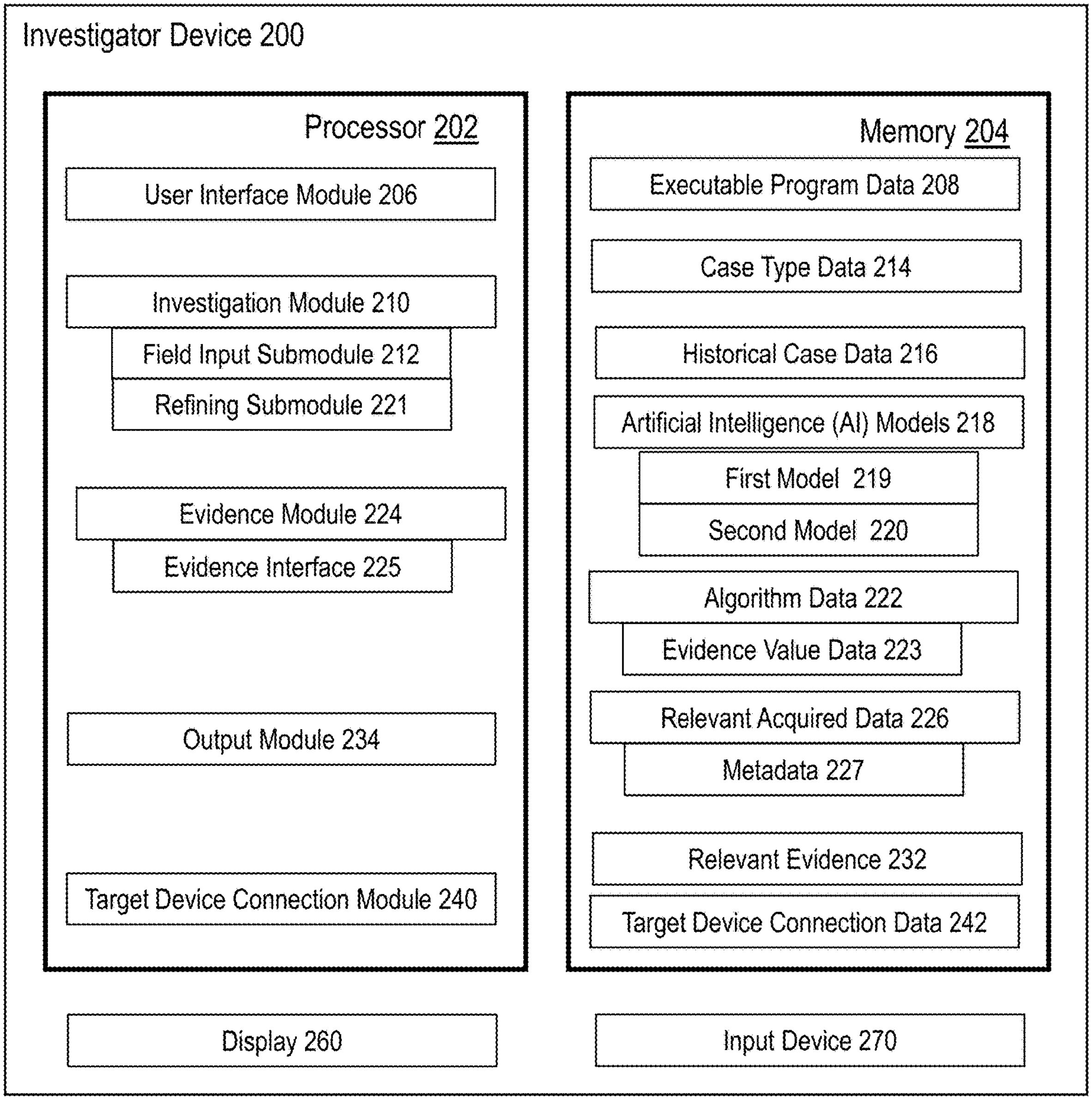
FIG. 2 is a block diagram of computer system for surfacing relevant evidence from a target device using an algorithm created from an artificial intelligence (AI) model, according to an embodiment.

Referring now to FIG. 2, shown therein is a block diagram of an investigator device 200 for surfacing relevant evidence from a target device using an algorithm created from an artificial intelligence (AI) model, according to an embodiment. The investigator device 200 may be implemented by the computer system 10 of FIG. 1.

Computer system 200 includes processor 202, memory 204, display 260, and input device 270.

Processor 202 includes user interface module 206, investigation module 210, evidence module 224, output module 232, and target device connection module 240.

Memory 204 includes executable program data 208, historical case data 212, artificial intelligence (AI) models 218, algorithm data 222, relevant acquired data 226, relevant evidence 234, and target device connection data 242.

The user interface module 206 is configured to generate a user interface which enables the user (hereafter investigator) of the investigator device 200 to interact with the various modules and software on the investigator device 200 to perform a digital forensic investigation. The user interface module 206 also allows the investigator to interact with the various modules and data on the investigator device 200 when the investigator is not performing a digital forensic investigation. The user interface is displayed via display 260.

The instructions and data required to run the modules of processor 202 are stored as executable program data 208 in memory 204.

The investigation module 210 with the user interface module 206 provides an investigation interface which enables an investigator to input information about an investigation. A case type is selected and a field input submodule 212 uses case type data 214 from memory 204 to provide fields for information which may be relevant to the case type. Case types may be categorized according to behavior or offence type. For example, case types may include homicide, assault, fraud, theft, or the like. Case types are not particularly limited and may be configured to suit specific known types of behavior which the investigator wishes to identify. Each case type has its own set of corresponding data input fields. Input can be entered into the fields via input device 270 (e.g., via a keyboard).

The fields may include any type of information relevant to a case including, but not limited to names, nicknames, locations, dates and times, weapons, vehicles, license plates, and/or drugs. The information may be input as strings into the fields provided for the case type selected. For example, an input field may be a time range, and a range of time surrounding a known incident may be input into the field (e.g., three hours before to three hours after the incident).

The case type data 214 may be generated from historical case data 216 of each case type.

Based on the information input into the fields, at least one AI model 218 is either selected automatically by the investigation module 210 or determined and suggested (i.e., presented in the user interface) to the investigator by the investigation module 210 for manual selection via the user interface.

The AI model(s) 218 are created and trained based on historical case data 216. Each AI model 218 includes encoded rules for determining and outputting an evidence value for potential evidence, as a score and/or rank, based on the value of specific types of evidence in the historical case data 216 upon which the AI model is based. For example, the rules may indicate that a picture of a weapon known to be used in a crime is of high value but a picture of a person of interest holding the weapon is of even higher value.

There may be multiple models for each case type and the selected or suggested AI model(s) are based on the information that was input into the fields. For example, if there are no locations of interest, a model that searches for locations or places a high evidence value on location is less likely to be suggested.

A single AI model 218 which covers all of the elements of the case as input into the fields may be used in an investigation or any number of models may be employed.

For example, the investigation module 210 may suggest, after the input of information into the fields for the case type, a first model 219 and a second model 220. When two or more models are suggested based on the input information, the models may be integrated into a single model, or the models may be run as separate models.

A refining submodule 221 may be used by the investigator to refine the investigation. The investigator may refine the input information to alter the model suggestions. The investigator may refine the model(s) to fit the input information. Refining the model(s) may include adding or removing data types. When a model is generated to include submodels (pre-defined filters), the submodels within a case type may be directed towards data types, such as text files or picture files, and refining the model may include adding or removing a data type submodel. Submodels may also be applied for other aspects of the case, for example, specific weapons or vehicles. While a model may be generated to include at least one submodel, a model is not simply an aggregation of submodels.

Refining the model(s) may include adjusting the scoring rules of the model. In some cases, a threshold may be set by the user through the user interface against which the score may be compared to determine a rank or other relevance output.

When a model is significantly refined, the refined model may be saved as a new AI model 218 in memory 204 to be used in future investigations. That is, when there is no appropriate model available based on the information input into the fields and it is necessary to create a refined model either by refining or by adding/removing submodels, the refined model can be stored as a new AI model 218 so that future investigations can use the refined model without needed remake the model.

As will be discussed further below, each AI model 218 may be an evolving model that can be trained further each time a relevant investigation is carried out. A benefit of using trained AI models instead of merely aggregating separate submodels representing single filters or tools into a comprehensive model is that the case can be investigated holistically instead of on a filter by filter basis. That is, because the AI models are trained for specific case types, evidence can be searched for within the context of the case type. For example, the model within the context of a specific case type can understand the meaning of a conversation beyond just the specific words which were used (e.g., in a case of sexual harassment in the work place the model may be trained to pick up innuendo instead of just to search for specific words). As evidence is detected or identified during investigation or scanning of the target dataset, each piece of evidence can be related to and ranked against the investigation as a whole. Each new piece of evidence surfaced may alter the rest of the search or the projected value of a piece of evidence.

In some embodiments, the AI models are trained using supervised machine learning techniques. For example, datasets may be split into training, validation, and test datasets. The model may be trained using a training dataset and a negative dataset. Model parameters may be tuned using a validation set, and the test dataset withheld for evaluation purposes. For object detection, the training images may be annotated using bounding boxes to identify ground truth values. The AI models may use deep learning techniques.

The AI models may be evaluated by running inference on the test dataset and a receiver operating characteristic (ROC) curve may be generated for analysis. An F1 score may be calculated for the set of possible thresholds, and the threshold chosen for the optimal F1 score.

Different model architectures may be used for chat classification (Chat Classification model), picture level classification (Image Classifier model), and object level classification (Image Classifier model). The base model architectures may be pre-trained with industry datasets (i.e., transfer learning may be employed), and the models may be subsequently fine-tuned on custom datasets. Each custom dataset may be treated differently according to the forensic purpose, but are similar across different contexts/data types.

In an embodiment, at least one of the AI models may be a Chat Classification model. The Chat Classification model may be a machine learning model. The Chat Classification model may be trained on datasets (e.g., custom dataset) of chat threads containing relevant conversations. The chat threads may be generated by one or more chat applications (e.g., Skype chat threads, or the like).

In an embodiment, the Chat Classification model may include a pre-processing step wherein an input chat thread is divided into chunks using a sliding window algorithm. The size of the window and step value may be constants that correspond to the window size and step used during training. The model takes the set of chunks as input and outputs a prediction score between 0 and 1 for each window chunk. If any window scores a prediction value higher than a predetermined threshold, both the messages in that window and the entire conversation are assigned a tag by the model for further analysis.

In an embodiment, at least one of the AI models may be an Image Classifier model. The Image Classifier model may be a machine learning model. The Image Classifier model may be trained on custom datasets of relevant images. In some embodiments, there may be two categories of image models: (i) one or more picture level classifiers which target the contents of the entire image, and (ii) one or more object level classifiers which target small objects within an image.

In an embodiment, the Image Classifier model may include pre-processing images by scaling to a thumbnail size (e.g., 299×299 pixels) RGBA numpy array. The model then takes an array of images as input and outputs a prediction score for each image. If any window scores a prediction value higher than a predetermined threshold, then the picture is assigned a tag by the model for further analysis by the Examiner.

In an embodiment, the Image Classifier model may include pre-processing images by scaling to a large thumbnail size (e.g., 640×640 pixels) RGBA numpy array. If any window scores a prediction value higher than a predetermined threshold, then the picture is assigned a tag by the model for further analysis by the Examiner.

Upon automatic selection, manual selection, or refinement of the AI model(s) 218, the AI model 218 creates an algorithm based on the strings input into the fields. The algorithm includes algorithm data 222 which represents how the search should be performed. The algorithm data includes evidence value data 223 which represents how the surfaced forensic data should be scored/ranked. Algorithm data 222 and evidence value data 223 are stored in memory 204.

The executable program data 208 provides instructions to evidence module 224 to carry out an investigation using the algorithm data 222.

The target device connection module 240 enables the computer system to connect to the target device to search the data on the target device for forensic data of potential evidentiary relevance. Any target device connection data 242 required to establish a connection to the target device is stored in the memory 204. The target device may be a device such as a mobile device, laptop, desktop, or external hard drive. The target device may be a seized device (e.g., seized from a suspect) or a corporate device (e.g., a corporate laptop of an employee). The target device may be a cloud computing device, such as a cloud server, for example, the target device 120 may be a cloud computing device storing a target dataset linked to a cloud storage account of an individual under investigation.

The evidence module 224 provides an evidence interface 225. The evidence interface 225 includes a visualization of the forensic data that is surfaced within the context of the investigation as a whole. The evidence interface 225 may display a timeline of the case showing when potential evidence was created or occurred. The evidence interface 225 may display a map showing where potential evidence (e.g., forensic data artifacts) was created or occurred. The evidence interface 225 displays evidence values for each piece of surfaced potential evidence. The evidence values may be a ranking against the other surfaced potential evidence and a score of how likely the potential evidence is to be valuable to the investigation (e.g., would the potential evidence enable securing a warrant, an arrest, or a conviction).

The evidence module 224 may complete the entire search using the algorithm data 222 and then display the results on evidence interface 225 using relevant acquired data 226 and metadata 227.

Any relevant data acquired during the search is stored in memory 204 as relevant acquired data 226. The relevant acquired data 226 may also include any metadata 227 for data items, files, or artifacts, such as timestamp data (e.g., indicating when a file, item, or artifact was created, modified, etc.), geolocation data (e.g., indicating where a file, item, or artifact was created, modified, sent, received, etc.), and device ID data (e.g., indicating a device the item was created on, sent from, etc.). The metadata 227 is used to generate the visualization (e.g., timeline, map) displaying in evidence interface 225.

Relevant acquired data 226 that is assigned a high evidence value score or rank may be stored as forensically relevant data 232. An output module 234 may follow instructions from executable program data 208 to provide an output of the investigation, such as a report detailing the relevant data 232. The output may include recommendations or commentary of whether the data could be used for certain tasks (e.g., historically this evidence would be sufficient to secure a warrant or historically this evidence will not be sufficient for a conviction). The AI model may have an automatic threshold above which evidence is categorized as relevant data 232 or the investigator may set a threshold. The threshold may be based on the magnitude of the score or the rank (e.g., a score of at least 90 out of 100 represents relevant evidence) or may be a certain percentage of the evidence (e.g., the top 25% of evidence is classified as relevant evidence).

In other embodiments data may be scored before being acquired, wherein only data above a certain high evidence value score is acquired. This acquisition threshold may be the same or lower than the score required to define "relevant evidence". For example, any data which has a score greater than 50 out of 100 may be acquired, while only data with a score of at least 90 out of 100 is classified as "relevant evidence".

Beyond the input of relevant information into the fields, the investigation, processing, and analysis of the target dataset is carried out without the need for further investigator input (and in some embodiments, the case type and relevant case information could be extracted from a case file using a different AI program). That is, the investigator only needs to input a case type and relevant information into the predetermined and case type-specific case type fields in order to receive an output of relevant evidence 242 and possibly recommendations regarding the use of the evidence and to view an evidence interface (or dashboard) which shows an overview of the acquired evidence visualized on a timeline and/or a map of the case. A threshold for the potential evidence that is actually shown on the timeline or the map may be set whereby only artifacts or data items having an evidence value score above a certain threshold are included in and displayed on the timeline or map. The threshold may be adjustable by user input through the user interface to show different amounts of potential evidence on the timeline or map.

An example will now be described, according to an embodiment. In this example, the inciting incident may be a homicide. The computer system generates and displays a user interface for selecting a case type from a set of predetermined case types that include a homicide case type. The investigator selects the homicide case type via the user interface. The homicide case type may be selectable from a list of case types (e.g., displayed as a drop-down menu on a user interface). The investigation module 210 uses case type data 214 specific to the selected homicide case type to display relevant data input fields for a homicide case type on the display 260.

The investigator may know who the suspects or persons of interest are and input their names and/or nicknames into the name fields, which may be stored as string data by the computer system. The investigator may know when the homicide occurred and input the time of the incident and a time range of three hours before and three hours after the incident into time fields. The investigator may know that the weapon was a handgun and input that a handgun was used into a weapon type field. The investigator may know the location of the homicide and may input that location and a range around the location in which to search for any geo-location data into location fields. The location range may be a distance or may be based on population density and may differ based on whether the environment is rural or urban. The investigator may input keywords that are relevant to the case.

The investigation module 210 selects an AI model 218 that is based on the data input provided into the case type-specific data fields. The investigator may review the selected AI model to determine if any refinements should be made. A homicide AI model may include further search parameters or keywords automatically. For example, words that may be relevant such as "shoot", "kill", "alibi", etc. or keywords or phrases that are known to be used often in confessions or when discussing motives or intent for a crime. The AI model provides a holistic approach wherein evidence is evaluated within the context of the entire case and not just on a piece by piece basis. For example, a text message about wanting to shoot someone may receive a higher evidence value score when combined with a picture of a gun found on the same device than the text message may without having identified such a picture. The AI model 218 would then create an algorithm for a search using the input information.

The investigator device 200 connects to the target device using target device connection module 240 and executes the algorithm. Once the processing of the target device data is complete, the evidence module 224 generates and displays an evidence interface 225. The evidence interface 225 includes forensic data artifacts having potential evidentiary value (relevant acquired data 226) with associated evidence value scores. The evidence interface 225 includes a timeline visualization wherein the forensic data artifacts surfaced are plotted on a timeline or time series (using timestamp metadata associated with the forensic data artifact) and a map visualization wherein the forensic data artifacts surfaced are plotted on a map graphic (using geolocation metadata associated with the forensic data artifact).

As an example of evidence value scoring, a piece of evidence showing a person of interest near the location of interest in the time frame of interest is assigned a higher evidence value score than a piece of evidence showing the person of interest at the location of interest but on another day (i.e., not within the timeframe of interest).

The output module 234 generates a report of the relevant evidence. The report may summarize a series of events such as a timeline of the whereabouts of a specific person of interest and where and when they sent certain messages. The report may include recommendations. For example, the report may suggest that the evidence found is enough to secure a warrant for searching a suspect's home or for arresting a suspect and charging them with a homicide. Such suggestions may be determined by referencing evidence value scores against reference data (e.g., thresholds, historical evidence value scores known to produce a certain outcome, etc.).

Figure 3:
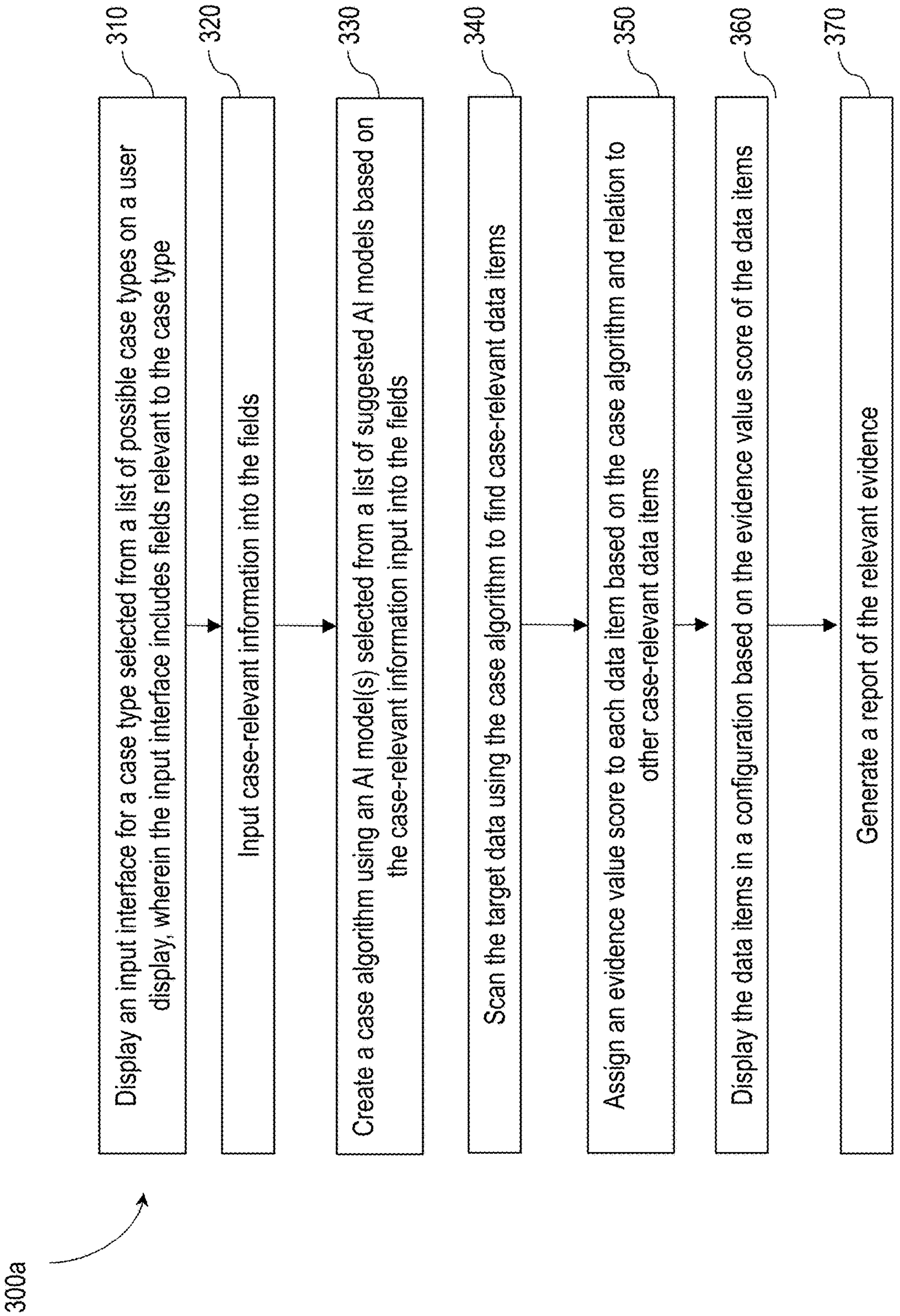
FIG. 3 is a flow diagram of a method of using an AI model to create an algorithm to search for and rank relevant data items in a digital forensic investigation, according to an embodiment.

Referring now to FIG. 3, shown therein is a method 300 of using an AI model to create an algorithm to search for and rank relevant forensic data items in a target device dataset as part of a digital forensic investigation, according to an embodiment.

At 310, a user interface is displayed for a case type which has been selected by a user. The user interface includes data entry fields which are known to be relevant to the case type. The fields are generated based on data from past cases of the case type that was known to be present and useful. In some embodiment, the user may manually input a case type. In other embodiments, the case type may be extracted from a case file using a different AI program.

At 320, case-relevant information is input into the case type-specific data entry fields in the user interface. Case-relevant information may include, for example, names, nicknames, locations, dates and times, weapons, vehicles, license plates, drugs, etc. In some embodiments, the user may manually input the information. In other embodiments, a different AI program may extract the information from a case file.

At 330, one or more AI models are selected by the computer system based on the case-relevant information which was input into the fields and the AI model is used to create a case algorithm for searching for potential evidence and determining an evidence value score for the potential evidence. The AI models are generated and trained by historical case data and include instructions for performing searches for potential evidence as well as instructions for determining an evidence value score for potential evidence.

In some embodiments, the AI model may be automatically selected. In other embodiments, the user may manually select an AI model from a list of suggested AI models. In some embodiments, more than one AI model may be selected. In some embodiments, an AI model may be refined by a user. For example, the user may change the evidence value score instructions within the model or may change the data types for which the model searches.

At 340, data from a target device is scanned for case-relevant data items or data artifacts using the case algorithm. The algorithm scans the target device for data items/artifacts which include at least one of the pieces of case-relevant information input into the fields. The AI model may also include further search terms or parameters which were not input by the user but are known to be relevant to the case type and the target device is also scanned for those search terms/parameters.

At 350, evidence value scores are assigned to each case-relevant data item or data artifact based on the case algorithm as well as the relationship between each case-relevant data item/artifact and every other case-relevant data item/artifact. In a simplified example, the computer system is programmed to assign a higher evidence value score to data items/artifacts which include information from two of the input fields would have than those that include information from only one input field. However, each piece of evidence is also analyzed from a holistic perspective. For example, a text message about wanting to shoot someone will receive a higher evidence value score when combined with a picture of a gun found on the same device.

At 360, the data items/artifacts are displayed on a user interface as a dashboard which provides a visualization of the entire investigation. The data items/artifacts may be displayed on a timeline visualization and/or a map visualization. The data items/artifacts may be displayed in a manner which shows their evidence value scores (as scores, ranks, or both). For example, each piece of evidence shown in a timeline may have a score beside it or surfaced evidence may be presented in an ordered list format, for example from highest evidence value score to lowest. Other possible visualizations include color coding data items/artifacts or a data item/artifact may be shown on a map at a location where it was created and items with a higher evidence value score may have larger font than those with lower evidence value scores. Generally speaking, data artifacts with a higher evidence value score may be visually distinguished in the user interface from data artifacts with a lower evidence value score.

At 370, a report detailing the relevant evidence is generated. The report may include a list of relevant evidence in order of highest evidence value score to lowest. Only relevant evidence above a threshold evidence value score may be included in the report. The report may include a list of recommendations. For example, the report may state that because a piece of evidence or a number of pieces of evidence are or a certain type or achieved a high enough evidence value score the likelihood of completing an action, e.g., securing a warrant or arresting a suspect, is high.

Figure 4:
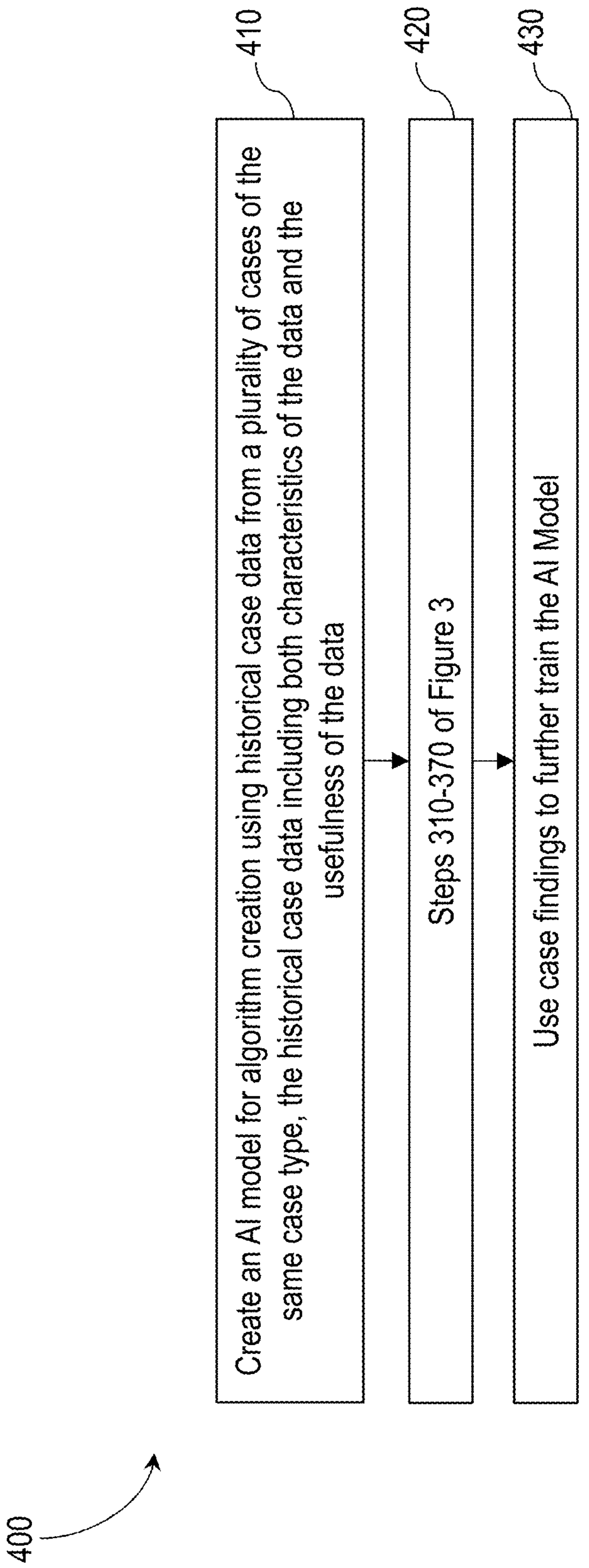
FIG. 4 is a flow diagram of a method of training and re-training an AI model for creating algorithms for searching and ranking case-relevant data items in a digital forensic investigation, according to an embodiment.

Referring now to FIG. 4, shown therein is a method 400 of training and re-training an AI model for creating algorithms for searching and ranking case-relevant data items in a digital forensic investigation, according to an embodiment.

At 410, an AI model is created using historical case data from a plurality of cases of a specific case type. The historical case data includes both the characteristics of the data and the usefulness of the data. The historical case data may be in the form of labelled data sets. The historical case data may have one or more tag types associated therewith. The tags may be provided by an investigator. The tags may be provided by artificial intelligence (e.g., a machine learning algorithm).

The AI model is trained by recognizing the types of information which are usually present and which are likely to provide evidence for the case type, for example, names, nicknames, locations, dates and times, weapons, vehicles, license plates, drugs, etc. The types of information that are commonly found in cases of a certain type are used to create filters or search parameters for use in future investigations.

The AI models are also trained by recognizing which evidence that was found for previous cases was ultimately useful within the course of the investigation or prosecution of a case. The data on usefulness of evidence is used to create rules for determining an evidence value score for potential evidence that is found in new investigations.

The AI model is also trained to view cases holistically, wherein a single piece of evidence is analyzed within the context of the other pieces of evidence to estimate a true evidence value score for that single piece of evidence.

When case-relevant information is input into the model, the model creates a case algorithm from the case-relevant information and can scan data of a target device in an integrated fashion wherein the data is not merely being searched one keyword filter at a time. Scanning of the data is done in the context of a specific case type, wherein the meaning of certain words or pictures which would be irrelevant in other case types is known by the AI model and therefore important pieces of evidence are not missed.

At 420, an investigation is carried out using the AI model. The investigation is the same as steps 310-370 of FIG. 3, and may or may not further include additional knowledge of the outcome of the investigation. That is, an action may or may not have occurred based on the evidence which was surfaced during the investigation and this may or may not have affected the evidence value scores of the surface evidence. For example, during the investigation a piece of evidence may have been surfaced and given an evidence value score of 75 out of 100 with the recommendation that this piece of evidence was not likely to assist in securing a warrant. However, the evidence may have, in concert with other evidence, been successfully used to secure a warrant and therefore the evidence value score may have been adjusted upwards.

At 430, the case findings of the investigation at 420 are used to further train the AI model. For example, the AI model when used at 420 provided a score of 75 to the piece of evidence which ultimately was more useful than a score of 75 would suggest. Therefore, the AI model may be trained by this data to provide a higher evidence value score to similar pieces of evidence in future cases.

Figure 5:
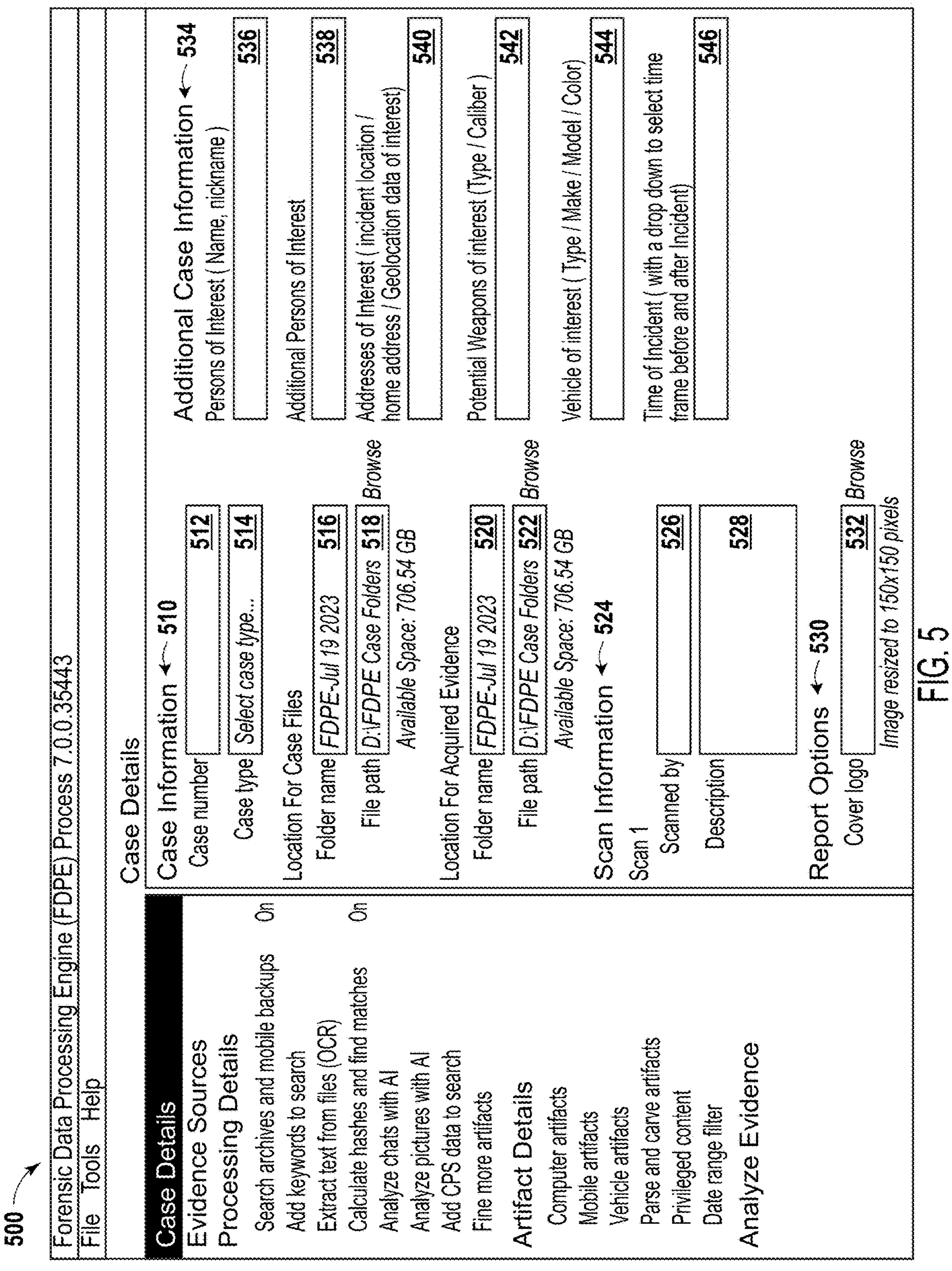
FIG. 5 is an example graphical user interface for inputting case data generated by a computer system for surfacing and displaying relevant forensic data in a digital forensic investigation, according to an embodiment.
Figure 6:
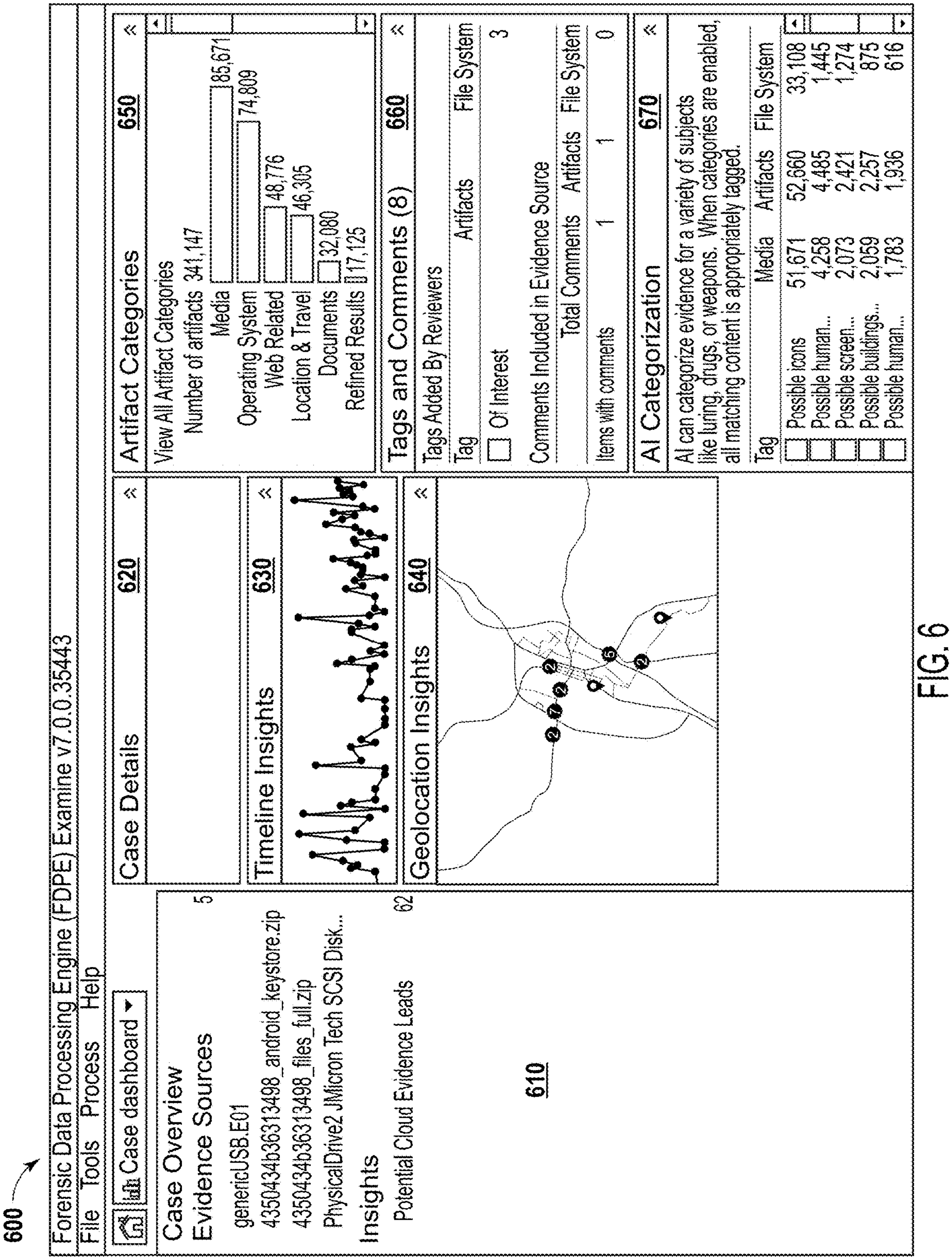
FIG. 6 is an example graphical user interface generated by a computer system for surfacing and displaying relevant forensic data in a digital forensic investigation, according to an embodiment.

Referring now to FIGS. 5 and 6, shown therein are example graphical user interfaces 500, 600 generated by a computer system for surfacing and displaying relevant forensic data in a digital forensic investigation, according to an embodiment.

FIG. 5 is a graphical user interface 500 for inputting case data (i.e., case details). The GUI 500 includes a plurality of data input fields (e.g., text input fields for receiving an input text string) for receiving input data from a user interacting with the GUI 500. A user enters case-relevant information into the various fields as input for the computer to select at least one AI model to generate a case algorithm. The graphical user interface 500 includes data input fields for case information 510, scan information 520, report options 525 and additional information 530. While many data input fields of GUI 500 are configured to receive text input strings, in other embodiments, other types of data input fields may be used (e.g., drop down menus, radio buttons, selectable fields, or the like).

The input fields for case information 510 include UI element 512 configured to receive an input text string of a case number and UI element 514 configured to receive a selection of a case type (a drop-down menu of choices).

Case information 510 includes data input fields for inputting information regarding location of case files including a UI element 516 configured to receive a text input of a folder name and UI element 518 configured to receive a text input of a file path. UI element 518 may allow the user to browse locations to select the case files.

Case information 510 includes data input fields for inputting information regarding location of acquired evidence including a UI element 520 configured to receive an input text string of a folder name and UI element 522 configured to receive an input text string of a file path. UI element 522 may allow the user to browse locations to store the acquired evidence.

Scan information 524 includes data input fields for inputting information about the scan which is to be performed. The data input fields include a UI element 526 configured to receive an input text string identifying the user performing the scan and UI element 528 configured to receive an input text string of a description of the scan being performed.

Report options 530 fields include a UI element 532 configured to receive an input text string of a cover logo for the report. The UI element 532 may allow the user to browse various files to find the appropriate cover logo.

Additional case information 534 includes data input fields for inputting additional case-relevant information. The data input fields include a UI element 536 configured to receive an input text string regarding persons of interest (e.g., name, nickname). The fields include a UI element 538 configured to receive an input text string of additional persons of interest. The data input fields include a UI element 540 configured to receive an input text string of addresses of interest (e.g., incident location, home address, geolocation data of interest). The data input fields include a UI element 542 configured to receive an input text string of a potential weapon of interest (e.g., type, caliber). The data input fields include a UI element 544 configured to receive an input text string of a vehicle of interest (e.g., type, make, model, color). The data input fields include a UI element 546 configured to receive an input text string of a time of incident. In some embodiments, any or all of the additional case information data input fields may include drop down menus or sub-fields to add additional details. The additional case information UI elements may change based on the case type selected at UI element 514.

The graphical user interface 500 is an example, and in other embodiments a case details graphical user interface may have fewer, more, or different UI elements configured to receive other information than shown in interface 500.

FIG. 6 is a graphical user interface 600 showing case insights generated by a case algorithm which would be generated using the case-relevant information input into a case details graphical user interface, for example graphical user interface 500.

The graphical user interface 600 includes a case overview window 610 which displays evidence sources and insights which are classified as potential cloud evidence leads.

The graphical user interface 600 includes a case insights window 620 for displaying artifacts hits such as names of interest, various communication, etc. The artifact hits are generated from the artifacts of interest which are found based on the case algorithm generated from the case-relevant information input into the case details graphical user interface.

The graphical user interface 600 includes a timeline insights window 630 for displaying a timeline of when artifacts of interest were generated (based on the available metadata).

The graphical user interface 600 includes a geographical insights window 640 for displaying locations of interest representing geolocations where artifacts of interest were generated. Geolocations may include geographical coordinates (e.g., lat/long coordinates) plotted on a map. In some cases, the map may be generated using an external mapping service (e.g., Google Maps, OpenStreetMap, or the like).

The graphical user interface 600 includes an artifact categories window 650 displaying a breakdown of categories of artifacts of interest. In FIG. 6, the breakdown is shown as a bar graph with the numbers of artifacts of each category displayed. The categories in FIG. 6 include media, operating system, web related, location and travel, documents, related results, etc.

The graphical user interface 600 includes a tags and comments window 660 wherein various tags and comments for artifacts of interest are displayed. The user can create tags during the generation of the case algorithm or tags may be automatically generated based on the search parameters. The created tags are assigned to any artifacts or data points which match criteria for the tag (e.g., file was created on a certain date, file includes a certain keyword, etc.). The user can also create comments during generation of the case algorithm. The tags and comments window 660 provides a visualization of any tags or comments which have been applied to the search results.

The graphical user interface 600 includes a categorization window 670 displaying various categorization tags and a breakdown of the artifacts of interest which fit various categorizations as well as the type of artifact (e.g., media, artifacts, file system). Categorization tags can be used for a variety of subjects (e.g., luring, drugs, weapons) and enable appropriate tagging of matching content. The categorization tags may be enabled based on the case type and case-relevant information input into the case details graphical user interface. A user may also manually enable (or disable) any categorization tags regardless of the case type and have any matching content tagged appropriately.

While the above description provides examples of one or more apparatus, methods, or systems, it will be appreciated that other apparatus, methods, or systems may be within the scope of the claims as interpreted by one of skill in the art.

The invention claimed is:

1. A system for surfacing relevant forensic data in a digital forensic investigation, the system comprising:

a user interface module configured to generate a user interface for interaction with a user;

an investigation module configured to generate an investigation interface, wherein the investigation interface includes a field for selecting a case type from a plurality of case types and wherein upon selection of the case type the investigation interface displays a plurality of case type dependent data input fields for inputting case-relevant information;

at least one artificial intelligence (AI) model selected from a plurality of AI models based on the case-relevant information, the at least one AI model configured to create at least one algorithm for surfacing forensic data based on the case-relevant information and generating at least one evidence score for each of the surfaced forensic data; and an evidence module configured to:

scan at least one target device using the at least one algorithm and acquire relevant forensic data; and generate an evidence interface, wherein the evidence interface includes at least one visualization of the acquired relevant forensic data and at least one visualization of at least one evidence value score for each of the acquired relevant forensic data.

2. The system of claim 1 further comprising a refining module configured for the user to refine the data input fields.

3. The system of claim 1 wherein the at least one AI model includes a chat classification model.

4. The system of claim 3 wherein the chat classification model includes pre-processing wherein an input chat thread is divided into chunks using a sliding window algorithm, and wherein each chunk is used as an input and the chat classification model outputs an evidence value score for each chunk.

5. The system of claim 1 wherein the at least one AI model includes an image classifier model, and the image classifier model is a picture classifier, wherein a plurality of images are input into the picture classifier and the picture classifier outputs an evidence value score for each image.

6. The system of claim 1 wherein the at least one AI model includes an image classifier model, and the image classifier model is an object classifier, wherein a plurality of images are input into the object classifier and the object classifier outputs an evidence value score for each object in each image.

7. The system of claim 1 wherein the at least one evidence value score of each of the acquired relevant forensic data is calculated by comparison to past cases.

8. The system of claim 1 wherein the at least one evidence value score of each of the acquired relevant forensic data is calculated as a ranking within the acquired relevant forensic data.

9. The system of claim 1 further comprising an output module configured to generate a report.

10. The system of claim 1 wherein the data input fields are generated from previous case data.

11. A method of surfacing relevant forensic data in a digital forensic investigation, the method comprising:

generating, by an investigation module, an investigation interface including a field for selecting a case type;

displaying on the investigation interface, upon selection of a case type, a plurality of case type dependent data input fields for receiving case-relevant information;

selecting at least one AI model from a plurality of AI models based on the case-relevant information;

generating, by the at least one AI model, at least one algorithm for surfacing and evaluating forensic data;

scanning at least one target device for relevant forensic data using the at least one algorithm;

acquiring the relevant forensic data;

assigning at least one evidence score for each of the acquired relevant forensic data using the at least one algorithm; an generating an evidence interface, by an evidence module, wherein the evidence interface includes at least one visualization of the acquired relevant forensic data and at least one visualization of the at least one evidence value score of each of the acquired relevant forensic data.

12. The method of claim 11 further comprising refining the data input fields by a refining module.

13. The method of claim 11 wherein the at least one AI model includes a chat classification model.

14. The method of claim 13 further comprising pre-processing an input chat thread by the chat classification model, wherein the input chat thread is divided into chunks using a sliding window algorithm, and wherein each chunk is used as an input and the chat classification model outputs an evidence value score for each chunk.

15. The method of claim 11 wherein the at least one AI model includes an image classifier model, and the image classifier model is a picture classifier, wherein a plurality of images are input into the picture classifier and the picture classifier outputs an evidence value score for each image.

16. The method of claim 11 wherein the at least one AI model includes an image classifier model, and the image classifier model is an object classifier, wherein a plurality of images are input into the object classifier and the object classifier outputs an evidence value score for each object in each image.

17. The method of claim 11 wherein the at least one evidence value score of each of the acquired relevant forensic data is calculated by comparison to past cases.

18. The method of claim 11 wherein the at least one evidence value score of each of the acquired relevant forensic data is calculated as a ranking within the acquired relevant forensic data.

19. The method of claim 11 further comprising generating a report by an output module.

20. The method of claim 11 wherein the data input fields are generated from previous case data.

* * * * *